United States Patent [19]

Foladare et al.

[11] Patent Number: 5,761,277
[45] Date of Patent: Jun. 2, 1998

[54] PERSONAL MOBILE COMMUNICATION SYSTEM

[75] Inventors: Mark Jeffrey Foladare, Kendall Park; Shelley B. Goldman, East Brunswick; Nancy Murray, Morris Township, Morris County; David Phillip Silverman, Somerville; Yao-Chung Tsao, Middletown; Roy Philip Weber, Bridgewater, all of N.J.

[73] Assignee: AT&T Corp., Middletown, N.J.

[21] Appl. No.: 851,315

[22] Filed: May 5, 1997

Related U.S. Application Data

[60] Continuation of Ser. No. 487,357, Jun. 7, 1995, abandoned, which is a division of Ser. No. 264,651, Jun. 23, 1994, Pat. No. 5,546,442.

[51] Int. Cl.$^6$ ............................................. H04M 1/64
[52] U.S. Cl. ............................................. 379/89; 379/211
[58] Field of Search ......................... 379/67, 88, 89, 379/208, 210, 211, 212, 214, 201, 202, 217, 157

[56] References Cited

U.S. PATENT DOCUMENTS

| | | | |
|---|---|---|---|
| 4,723,273 | 2/1988 | Diesel et al. | 379/211 |
| 4,811,382 | 3/1989 | Sleevi | 379/67 |
| 5,007,076 | 4/1991 | Blakley | 379/67 |
| 5,151,929 | 9/1992 | Wolf | 379/57 |
| 5,243,642 | 9/1993 | Wise et al. | 379/82 |
| 5,307,399 | 4/1994 | Dai et al. | 379/58 |
| 5,309,512 | 5/1994 | Blackmon et al. | 379/67 |
| 5,327,480 | 7/1994 | Breeden | 379/57 |
| 5,394,465 | 2/1995 | Jo | 379/377 |
| 5,414,750 | 5/1995 | Bhagat et al. | 379/57 |
| 5,471,519 | 11/1995 | Howe et al. | 379/88 |
| 5,548,636 | 8/1996 | Bannister et al. | 379/211 |

FOREIGN PATENT DOCUMENTS

WO91/07838  5/1991  WIPO ............ H04M 11/00

Primary Examiner—Fan S. Tsang
Attorney, Agent, or Firm—Stephen M. Gurey

[57] ABSTRACT

We have recognized that in the prior art, to insure that there is at least some communication between the calling and called parties, when the called party is unavailable to take a call, the calling party may be connected to an alternate destination, e.g., a voice messaging system, and the caller's telephone call is considered completed. If the called party thereafter becomes available, the called party is not connected to the caller's telephone call. However, in accordance with the principles of the invention, this problem is overcome by, in response to receipt of an indication that the called party is available for a caller's telephone call after the caller's telephone call has already been connected to an alternate destination, a) disconnecting the caller's telephone call from the alternate destination and, instead, b) connecting it the called party, thus interrupting the connection between the caller and the alternate destination. Optionally, a tone or announcement may be supplied to the caller to indicate that the called party will now be connected "live" to the caller.

7 Claims, 4 Drawing Sheets

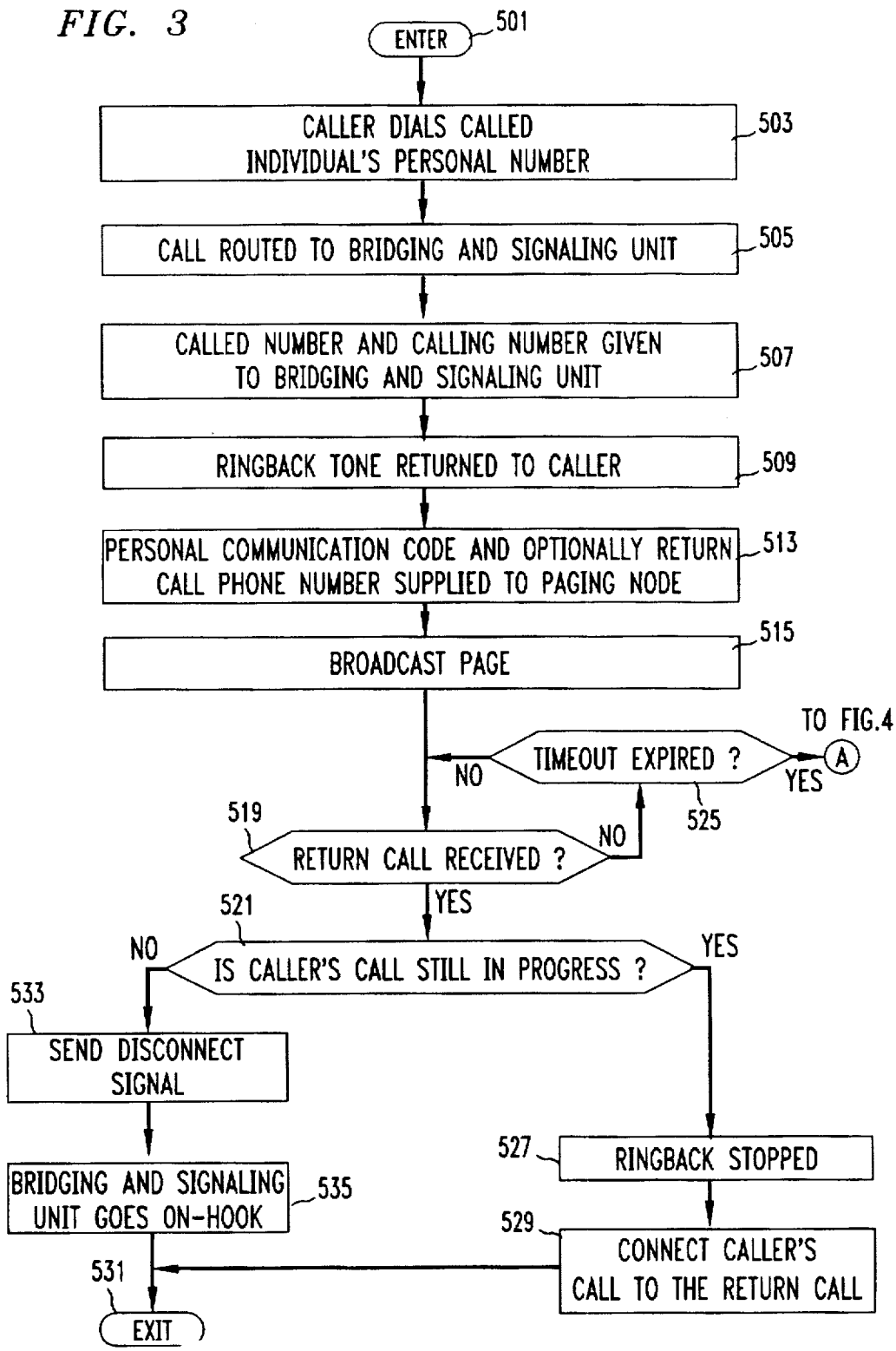

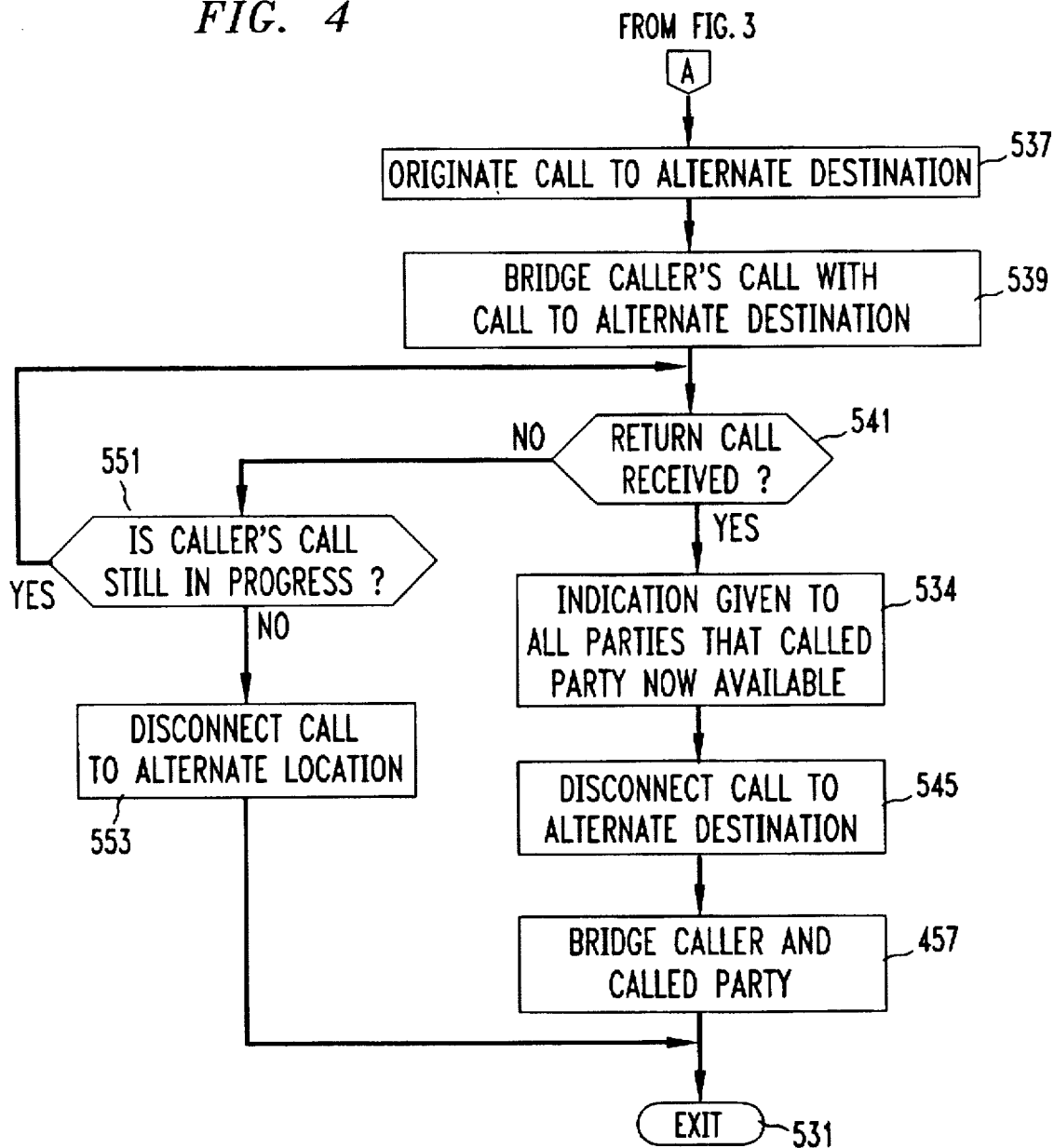

1

PERSONAL MOBILE COMMUNICATION SYSTEM

This is a continuation of application Ser. No. 08/487,357 filed Jun. 7, 1995, now abandoned, which is a Division of application Ser. No. 08/246,651, filed Jun. 23, 1994 now U.S. Pat. No. 5,546,442.

TECHNICAL FILED

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In one prior art system, described in copending application Ser. No. 07/843,685 assigned to the same assignee as the present application, in response to a telephone call from a caller, a return telephone call is automatically placed from a personal communications unit of a called individual to a meet-me bridge at which the caller's telephone call may be held for connection to the return telephone call. The called individual is alerted to the existence of the telephone call placed to him only upon an indication that the telephone call from the calling telephone remains in progress. This system assures the called individual that he will be connected to a telephone call that continues to exist when the personal communications unit alerts so that he can speak to the calling party.

SUMMARY OF THE INVENTION

We have recognized that system delays in transmitting the paging signal and the time required to establish the return telephone call, which may be exacerbated if call screening is employed prior to originating the return telephone call, are often longer than most callers are willing to wail Furthermore, not all pages will be successfully received nor will all page recipients be situated so as to be able to place return telephone calls. Therefore, to insure that there is ultimately at least some communication between the calling and called parties, the calling party may be connected to an alternate destination, e.g., a secretary, answering service or a voice messaging system, in the event that it is determined that the caller's telephone call cannot presently be connected to the called party, e.g., after a particular time period has passed and a return telephone call has not yet been received. Connections may also be made to the alternate destination if the called party's telephone number is busy. Unfortunately, if the return telephone call is thereafter received, the caller's telephone call is now considered completed, as it is engaged in a connection with the alternate destination, and, therefore, the called party's return telephone call is not been transferred to the alternate location, it might even no longer be available at the meet-me bridge for connection to the return telephone call.

In accordance with the principles of the invention, this problem is overcome by, in response to receipt of an indication that the called party is available for a caller's telephone call, e.g., receipt of a return telephone call, when the caller's telephone call has already been connected to an alternate destination a) disconnecting the caller's telephone call from the alternate destination and, instead, b) connecting it to the called party, e.g., to the called party's return telephone call, thus interrupting the connection between the caller and the alternate destination. Optionally, a tone or announcement may be supplied to the caller to indicate that the called party will now be connected "live" to the caller. Also, a tone or announcement may be supplied to the alternate destination, e.g., to inform a secretary that the principal, i.e., has picked up the telephone call. For calls using meet me bridges, in the event that the connection between the caller's telephone call and the alternate destination was made by transferring the caller's telephone call to the alternate destination, the caller's telephone call is transferred back to the meet-me bridge prior to connecting it to the return telephone call.

BRIEF DESCRIPTION OF THE DRAWING

In the drawing:

FIGS. 3 and 4, when connected together, show a flow chart of an exemplary process for completing a telephone call placed to the personal number of an individual associated with the personal communications unit shown in FIG. 1.

DETAILED DESCRIPTION

Figure 1:
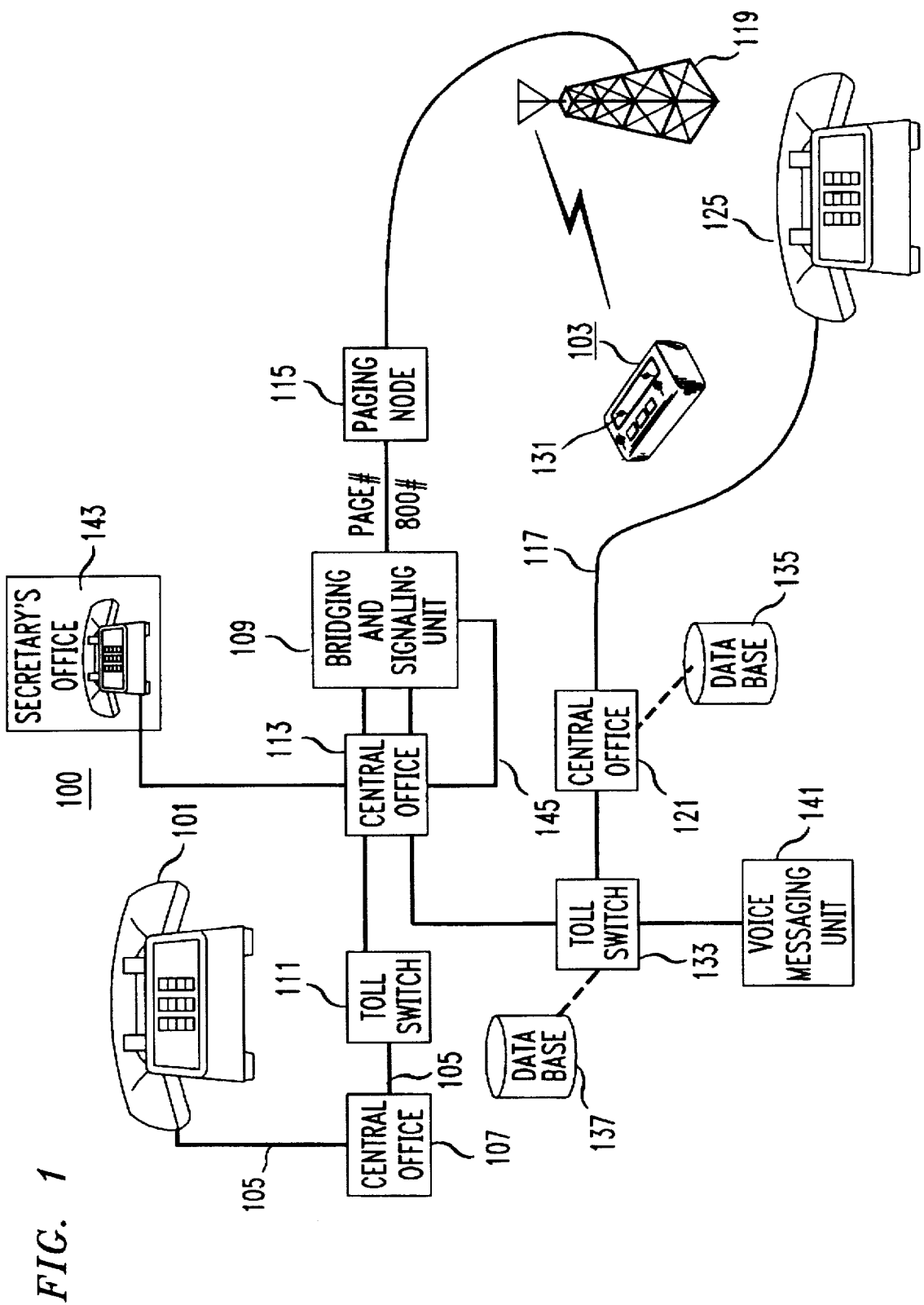
FIG. 1 shows an arrangement for providing telecommunications services, in accordance with the principles of the invention.

FIG. 1 shows arrangement 100 for providing telecommunications services, in accordance with the principles of the invention. A caller places a telephone call from calling telephone 101 to the personal telephone number of an individual associated with pager 103. The caller's telephone call passes over telephone line 105 to central office 107. Central office 107, in turn, routes the call to bridging and signaling unit 109, which is associated with the called number. Pager 103 is also associated with the called personal telephone number, as discussed further below.

Current United States telephone practices generally require that at least the one local exchange carrier (LEC), containing central office 107, routes the caller's telephone call. Also, the caller's telephone call may be routed via an inter-exchange carrier, represented by toll switch 111, and another local exchange carrier, represented by central office 113. Central offices 107 and 113 may be the same office. If so, the telephone call would not pass through any inter-exchange carrier or any other central offices. Other conventional arrangements of telecommunications carriers may be employed to route the callers call to bridging and signaling unit 109.

Bridging and signaling unit 109 implements a so-called "meet-me bridge" for connecting at least two incoming telephone calls to each other. Upon receipt of the caller's telephone call, bridging and signaling unit 109 forwards paging information to paging node 115. The paging information includes a predetermined code that uniquely identifies the called individual's pager 103 and, if not predetermined, a telephone number to which a return telephone call must be place in order to connect with, or "meet", the caller's telephone call. A copy of the predetermined code is stored within pager 103. Also, the telephone number for the return telephone call is reserved, in advance, for use by bridging and signaling unit 109. Its selection is described further below. Paging node 115 causes a paging signal containing the paging information to be broadcast from paging tower 119. Pagers and paging systems are well known in the art.

The telephone number of the return telephone call may be a translatable, e.g., 800-type, of telephone number. An advantage of using an 800-type of telephone number is that it allows the owner of pager 103 to place the return telephone call without having any information about the area code of the telephone line which he is using. This is because calls to 800-type telephone numbers are unlike calls to conventional telephone numbers. Telephone calls to conventional telephone numbers employ the area code for routing purposes. Such calls require the explicit dialing of the area code of the destination location for calls placed from one area code to another and that no area code be dialed for telephone calls placed within a single area code. However, 800-type telephone numbers employ the 800 area code to indicate that the telephone network should translate the telephone number to its corresponding destination location. As such, the 800 area code must always be dialed for such telephone calls to give this indication to the telephone network, even if the destination location is within the same area code as the location of the caller.

Pager 103 receives paging signals transmitted from paging tower 119. In the event that the code contained within the paging information of a paging signal matches the predetermined code stored in pager 103, pager 103 alerts. In response to the alerting by pager 103, the owner of pager 103 places a telephone call, which is the return telephone call, from telephone 125 to a particular telephone number which, if not predetermined, is specified in the page. As such, central office 121 receives the return telephone call and routes it to bridging and signaling unit 109 for connection to the caller's telephone call. To this end, central office 121 may route the call via an inter-exchange carrier, represented by toll switch 133, and another local exchange carrier, represented by central office 113. The routing of return telephone calls to 800-type telephone numbers follows well-known practices in the art for routing calls to 800-type telephone numbers. U.S. Pat. No. 4,191,860 issued to R. P. Weber on Mar. 4, 1980, describes one system for routing and translating 800-type numbers. The association of central office 121 with database 135 and toll switch 133 with database 137 aids in the routing process. It is noted that telephone 125 may be a mobile base telephone. If so, a mobile telephone switching office (MTSO) is employed to assist in routing the return call.

In the event that the combined delay, including: a) system delays in transmitting the paging signal; b) the time required by the pager owner to place the return telephone call— which may be exacerbated if the owner of pager 103 screens his pages prior to originating the return telephone call by examining an indication of the caller's identity that appears on display 131—; and c) the time to establish the return telephone call; exceeds a predetermined time period, e.g., 75 seconds, to insure that there is at least some communication between the calling and called parties, the calling party may be connected to an alternate destination, e.g., telephone 143 at the secretary's office, an answering service (not shown) or voice messaging unit 141, a conventional automated voice messaging system. If the predetermined time period is exceeded, the caller's telephone call is considered complete upon establishment of the connection with the alternate destination. Indeed, if the caller's telephone call has been transferred to the alternate location by central office 113, in response to a command of bridging and signaling unit 109, as opposed to being so-called "hair-pinned" through bridging and signaling unit 109, the caller's telephone call is not even available at the meet-me bridge to be connected to the return telephone call. Such a transfer may be effectuated using optional data link 145 between central office 113 and bridging and signaling unit 113. Such data links, e.g., a signaling system 7 (SS7) connection are well known in the art.

In accordance with the principles of the invention, this problem is overcome by, in response to receipt of a return telephone call for a caller's telephone call that was already connected to an alternate destination, a) disconnecting the caller's telephone call from the alternate destination and, instead, b) connecting it with the return telephone call, thus interrupting the completed connection to the alternate destination. In the event that the connection between the caller's telephone call and the alternate destination was made by transferring the caller's telephone call to the alternate destination, the caller's telephone call is transferred back to the meet-me bridge prior to connecting it to the return telephone call. The call may be retrieved by having bridging and signaling unit 109 transmitting a command over optional data link 145 to central office 113. Optionally, a tone or announcement may be supplied to the caller who was leaving a message to indicate that the called party has been located and will now be connected "live" to the caller. Also, a tone or announcement may be supplied to the alternate destination, e.g., to inform a secretary that the principal, i.e., the owner of pager 103, has picked up the call.

Figure 2:
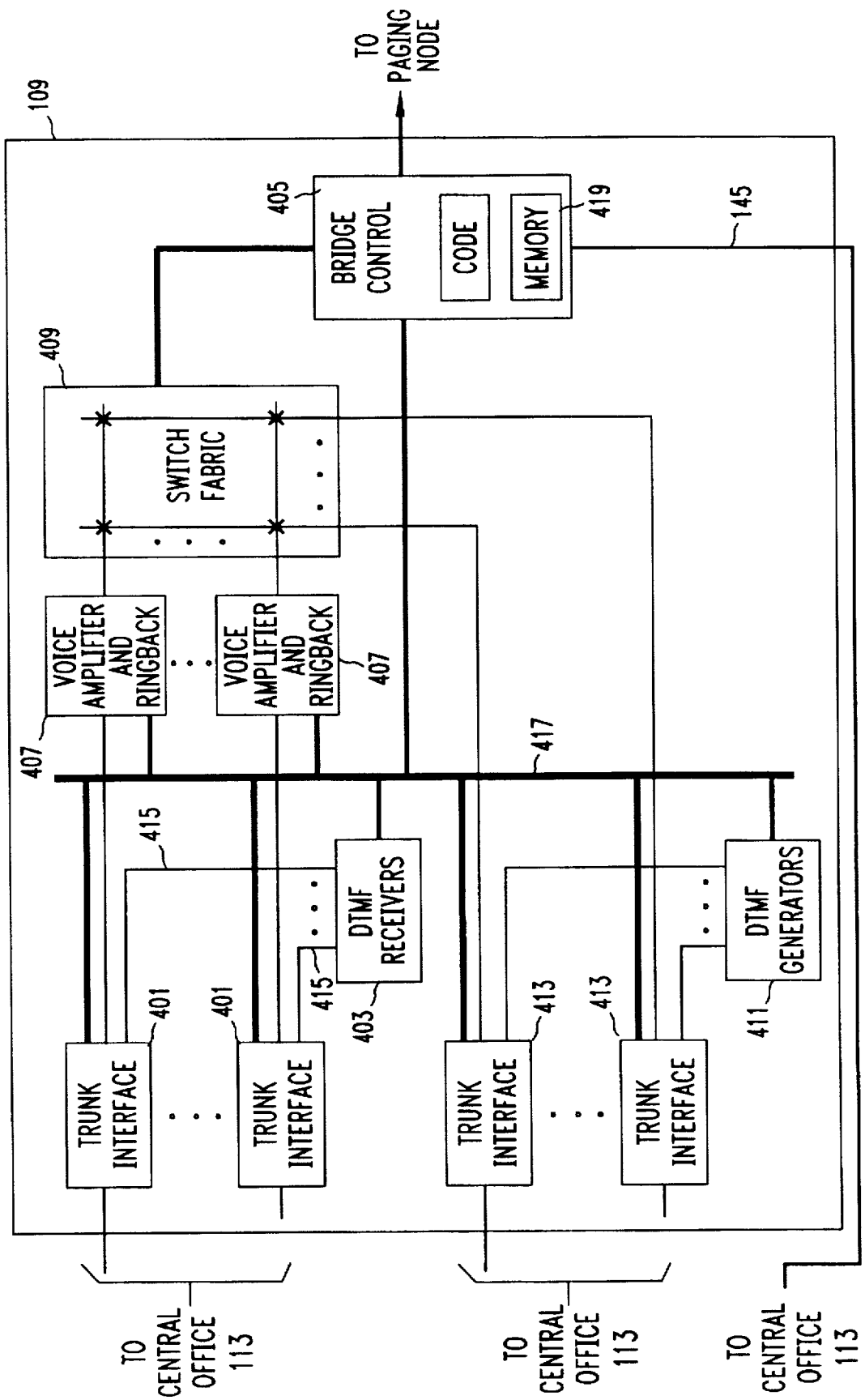
FIG. 2 shows, in block diagram form, an expanded view of the bridging and signaling unit shown in FIG. 1.

FIG. 2 shows, in block diagram form, an expanded view of bridging and signaling unit 109. Bridging and signaling unit 109 includes: a) trunk interfaces 401, b) dual tone multi-frequency (DTMF) receivers 403, c) bridge control 405, d) voice amplifier and ringback units 407, e) switch fabric 409, f) DTMF generators 411 and g) trunk interfaces 413. Bridge control 405 controls and coordinates the operation of bridging and signaling unit 109 by communicating commands and information over control bus 417.

A call placed by a caller to the personal number of an individual associated with pager 103 is received and terminated at bridging and signaling unit 109 by one of trunk interfaces 401. In one embodiment, the interface between central office 113 and trunk interfaces 401 is the same type of interface employed to connect a central office to a PBX equipped for direct inward dialing (DID). As part of terminating a call, central office 113 sends the last four digits of the personal telephone number to bridging and signaling unit 109 over the trunk These digits are sent as DTMF signals. One of DTMF receivers 403 receives the DTMF signals over one of lines 415 and decodes them. It informs bridge control 405 at which of trunk interfaces 401 the telephone call arrived and the decoded four digits.

In response to the reception of the four decoded digits, bridge control 405 instructs one of voice amplifier and audible ring units 407 to supply ringback tone over the one of trunk interfaces 401 at which the call arrived. Answer supervision is supplied so that an optional personal identification number (PIN) may be received from the caller. This optional PIN may be transmitted to pager 103 as part of the calling information. Since answer supervision is supplied, the caller is charged for the call from the time the answer supervision is supplied until the call is disconnected.

Bridge control 405 contains memory 419. Memory 419 maps the received four digits of the called individual's personal telephone number to the predetermined code stored in the pager 103 associated with the called individual. Bridge control 405 selects an idle one of trunk interfaces 413 at which to receive the return telephone call. The trunks connecting central office 113 to trunk interfaces 413 are dedicated trunks and each has its own telephone number. Thereafter, bridge control 405 supplies to paging node 115 (FIG. 1) both the telephone number of the trunk associated with the selected idle one of trunk interfaces 413, as the number for the return telephone call, and the predetermined code of the called individual.

Upon receipt of a return telephone call at the selected one of trunk interfaces 413 within a predetermined period, e.g., 75 seconds, bridge control 405 determines at which of trunk interfaces 401 is waiting the call of the caller that corresponds to this return telephone call. Bridge control 405 then commands switch fabric 409 to interconnect the caller's telephone call with its respective return telephone call. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength. It is noted that calls in which the called party is paged and must place a return telephone call to be connected to the calling party are known as "revertive calls".

In one embodiment of the invention, if a return telephone call is not received at one of trunk interfaces 413 within the predetermined time period, bridge control 405 instructs an idle, and not presently selected to receive a return telephone call, one of trunk interfaces 413 to go off-hook and to seize a line. Next, one of DTMF generators 411 is connected to the seized line and commanded to dial the telephone number of a predetermined alternate destination selected in advance by the called party. This telephone number is stored in memory 419 in association with the four digits of the called individual's personal telephone number and predetermined code. The one of trunk interfaces 401 at which the caller's telephone call is waiting is then connected, i.e., bridged, to the one of trunk interfaces 413 from which the telephone call to the alternate destination is being placed via switch fabric 409 and one of voice amplifier and ringback units 407. Once the call originated from the one of trunk interfaces 413 is completed, the calling party may converse with a person, or leave a message, at the alternate destination.

In accordance with the principles of the invention, if a return telephone call is received at the specified one of trunk interfaces 413 after the predetermined period but while the caller's telephone call is still connected to the alternate destination, the connection to the one of trunk interfaces 413 from which the telephone call to the alternate location was originated is disconnected and, in lieu thereof, the return telephone call is connected to the caller's telephone call as described above. Advantageously, the caller and the called party may now converse. Optionally, the return telephone call may be bridged on prior to the disconnecting of the telephone call to the alternate destination. In either case, a tone may be generated, e.g., by DTMF generators 411, indicating that the called party is now available. If the return telephone call is bridged on prior to the disconnecting of the telephone call to the alternate destination, the tone will be heard at the remote location. Such a configuration is useful if the telephone call to the alternate location is used for conversation with a person. Whether the return telephone call is bridged before or after the telephone call to the alternate location may be predetermined on a per called party basis. Information for effectuating the called party's choice may be stored in memory 419.

FIGS. 3 and 4, when connected together, show a flow chart of an exemplary process for completing a telephone call placed to the personal number of a called individual associated with pager 103 (FIG. 1), in accordance with the principles of the invention. The process begins in step 501 (FIG. 3) when a caller decides to make a call to the individual associated with pager 103 using his personal number. To this end, in step 503, the caller dials the called individual's personal number at telephone 101 (FIG. 1). A telecommunications carrier routes the call to bridging and signaling unit 109 in step 505. Thereafter, in step 507, the telecommunications carrier supplies the called number and, if available, the calling number to bridging and signaling unit 109.

In step 509, bridging and signaling unit 109 supplies ringback tone to telephone 101. Next, in step 511, bridging and signaling unit 109 sends to paging node 115 the paging information, i.e., the predetermined code of the called individual that is stored within pager 103 and, optionally, a) the telephone number to which the return telephone call must be made and b) an indication of the identity of the caller, in step 513. In step 515, paging tower 19 broadcasts a paging signal that includes the paging information.

Control passes to conditional branch point 519, which tests to determine if the return telephone call has been received from pager 103. If the test result in step 519 is YES, control passes to conditional branch point 521, in which bridging and signaling unit 109 tests to determine if the caller's telephone call is still in progress. If the test result in step 521 is YES, control passes to step 527 in which bridging and signaling unit 109 stops sending ringback tone to telephone 101. Next, in step 529, bridging and signaling unit 109 interconnects the caller's telephone call and the return telephone call. This allows the caller to talk with the called individual. The process is then exited in step 531.

If the test result in step 521 is NO, bridging and signaling unit 109 sends a disconnect signal to telephone 125 in step 533. Optionally, prior to sending the disconnect signal, a message is supplied to the owner of pager 103. Next, bridging and signaling unit 109 goes on-hook, in step 535. Thereafter, the process is exited in step 531.

If the test result in step 519 is NO, control passes to conditional branch point 525, which tests to determine if a predetermined time-out period in which to receive the return telephone call has expired. If the test result in step 525 is NO, control passes back to step 519 to await the return telephone call. If the test result in step 525 is YES, control passes to step 537, in which bridging and signaling unit 109 originates a call to an alternate destination. The alternate destination may be specified by the called party. In step 539, bridging and signaling unit 109 bridges the caller's telephone call with the telephone call to the alternate destination.

Next, in accordance with the principles of the invention, conditional branch point 541 tests to determine if a return telephone call is received from the called party. If the test result in step 541 is YES, control passes to optional step 534, in which an indication is give to all the parties that a return telephone call has been received from the called party. In step 545, the telephone call to the alternate destination is disconnected, in accordance with an aspect of the invention. The caller and called parties are then bridged together by bridging and signaling unit 109, in accordance with the principles of the invention. Thereafter, the process is exited in step 531.

If the test result in step 541 is NO, control passes to conditional branch point 551, which tests to determine if the caller's telephone call is still in progress. If the test result in step 551 is YES, control passes back to step 541. If the test result in step 551 is NO, control passes to step 553, in which the telephone call to the alternate location is disconnected. Thereafter, the process is exited in step 531.

At the end of a conversation between the called and calling parties, i.e., after the called and calling parties were successfully connected together, either the caller or the called individual will go on-hook. At that time, the call between the on-hook party and bridging and signaling unit 109 is taken down. Furthermore, bridging and signaling unit 109 causes the call by the party not going on-hook to be taken down as well.

In another embodiment of the invention, trunk interfaces 401 and 413 terminate all digital transmission facilities, e.g., T-1 or ISDN primary rate interfaces (PRI). However, the functionality of trunk interfaces 401 and 413, that of receiving, holding, and identifying telephone calls, remains the same. The design of such trunk interfaces is well known in the art. Also, such embodiments of the invention can include the processing of both in-band and out-of-band signals.

As noted above, display 131 can display the number of the caller if pager 103 receives the necessary information. The paging information may contain the caller's telephone number or other identifying information, e.g., a PIN.

As some callers may be impatient, the caller may be given the opportunity to be connected to the alternate destination at any time during the predetermined period, so that he need not wait the entire period. The caller may indicate his desire to be so connected by supplying a predetermined signal, e.g., a dual tone multi-frequency signal generated by pressing one of the keys at his telephone. Alternatively, there need not be any predetermined period. Instead, the connection of the caller to the alternate destination is solely at the discretion of the caller.

In another embodiment of the invention, also shown in FIG. 1, the caller at telephone 101 places a call by directly dialing the telephone number for telephone 125. In the event that the called party is unavailable, as indicated by a ring, no-telephone condition for a predetermined time at telephone 125 or a busy signal on telephone line 117, toll switch 133 disconnects the call from central office 121 and, instead, connects the call to voice messaging unit 141, a technique that is well known in the art Additionally, in accordance with an aspect of the invention, central office 121 records in data base 135 that a) a call was received for telephone 125, b) the call was not successfully connected, and c) the call was routed to voice messaging unit 141. Optionally, the time the caller's telephone call was routed to voice messaging unit 141 may also be recorded in data base 135. In accordance with the principles of the invention, if the central office 121 receives an indication that the called party has become available, e.g., an off-hook indication is received, central office 121 checks data base 135 to determine if, since the last time the telephone 125 went off-hook, there has been a call placed to telephone 125 that was not successfully completed and instead was routed to voice messaging unit 141. Central office 121 may also determine if such a call was received at a time that it is possible that the caller is still connected to voice messaging unit 141. If such a call was received, central office 121 queries toll switch, 133 to determine if the caller's telephone call is still connected to voice messaging unit 141. In accordance with the principles of the invention, if the caller's telephone call is still connected, central office 121 instructs toll switch 133 to disconnect the caller's telephone call from voice messaging unit 133 and to connect it instead through central office 121 to telephone 125. Thus, the called and calling parties may converse. As in the prior embodiment a tone or announcement may be supplied to the caller at telephone 101 indicating that the called party is being connected on the call.

It is noted that the principles of the invention are applicable to video telephone calls as well.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in completing a telephone call originated by a caller to the telephone number of a called party, comprising:
   monitoring a telephone line of the called party until an off-hook indication is received;
   determining if, since the last time a telephone associated with the telephone number went off-hook, there has been a call placed to the telephone that was not successfully completed and was instead routed to an alternate destination;
   determining that the routed call is still connected to the alternate destination; and
   disconnecting the routed call from the alternate destination and connecting it to the telephone line of the called party.

2. The method of claim 1, wherein said indication is an off-hook condition of the telephone of the called party.

3. Apparatus for use in completing a telephone call originated by a caller to the telephone number of a called party, comprising:
   means for monitoring a telephone line of the called party until an off-hook indication is received;
   means for determining if, since the last time the telephone went off-hook, there has been a call placed to a telephone associated with the telephone number that was not successfully completed and was instead routed to an alternate destination;
   means for determining that the routed call is still connected to the alternate destination; and
   means for disconnecting the routed call from the alternate destination and connecting it to the telephone line of the called party.

4. The apparatus of claim 3, wherein said indication is an off-hook condition of the telephone of the called party.

5. A method of completing a telephone call, comprising:
   receiving an incoming call at a central office;
   detecting one of a ring no-answer condition and a busy signal at a destination telephone;
   connecting the incoming call to an alternate destination;
   recording information in a database indicating that the incoming call was received but not successfully connected to the destination telephone;
   detecting an off-hook condition of the destination telephone;
   checking the database and determining that, since the last time the destination telephone went off-hook, there has been a call received that was not successfully connected to the destination telephone;

determining that the incoming call is still connected to the alternate destination; and disconnecting the incoming call from the alternate destination and connecting the incoming call to the destination telephone.

6. The invention as recited in claim 5, further comprising:

recording in the database information indicating a time that the incoming call was routed to the alternate destination; and determining whether the incoming call was received at a time such that it is possible that the caller is still connected to the alternate destination.

7. The invention as recited in claim 5, further comprising providing an indication notifying a calling party that the incoming call will now be connected to the destination telephone.

* * * * *